March 2, 1926.
F. R. HINTON
BANK CHECK
Filed July 24, 1925
1,575,205
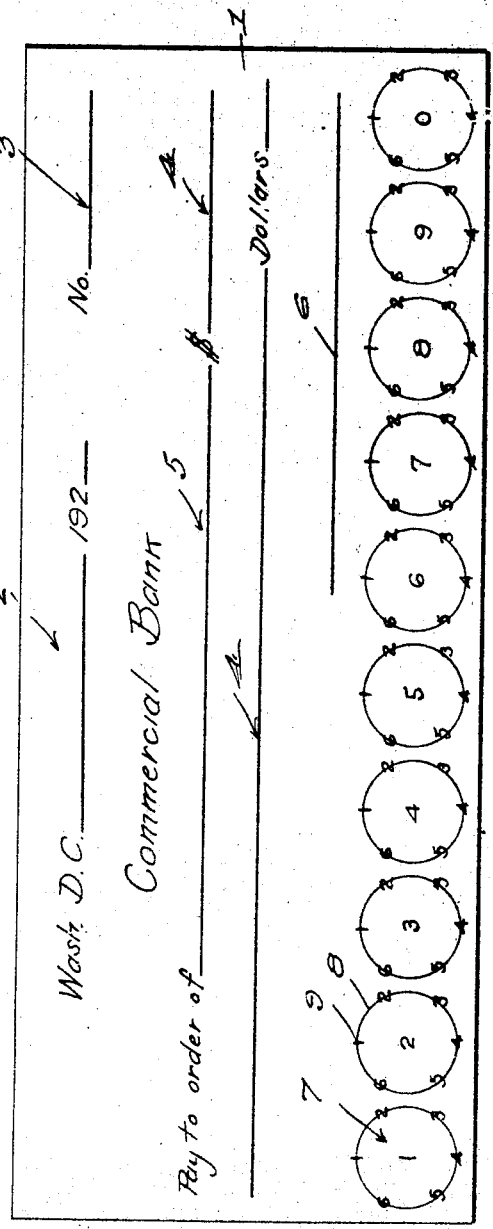
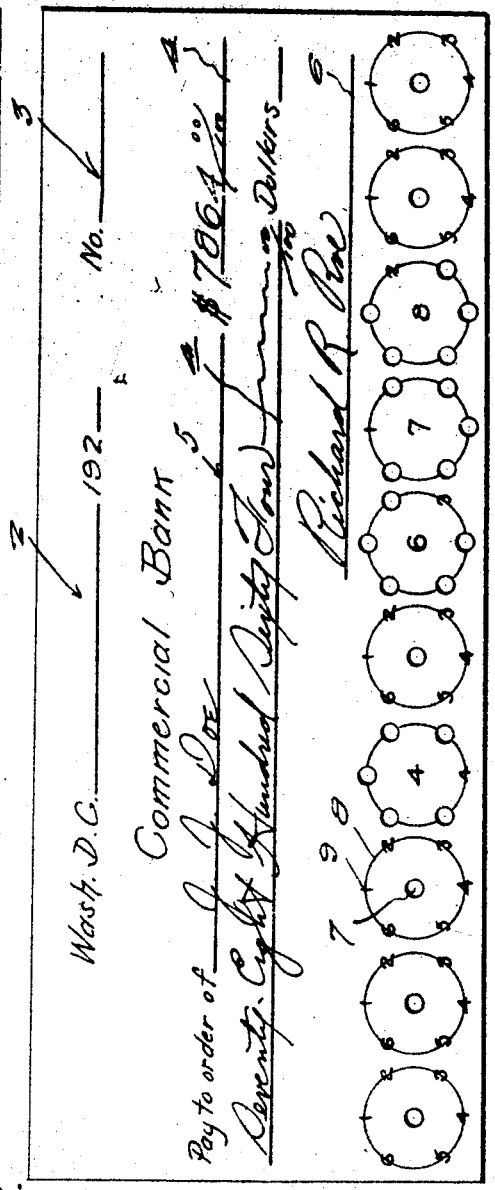
Inventor
F. R. Hinton
By
Attorney Patented Mar. 2, 1926.

1,575,205

UNITED STATES PATENT OFFICE.

FRANK R. HINTON, OF JOHNSON CITY, TEXAS.

BANK CHECK.

Application filed July 24, 1925. Serial No. 45,863.

*To all whom it may concern:*

Be it known that I, FRANK R. HINTON, a citizen of the United States, residing at Johnson City, in the county of Blanco and State of Texas, have invented certain new and useful Improvements in a Bank Check, of which the following is a specification.

This invention relates to an improved check, draft, or other negotiable paper which has been designed with a view toward preventing alteration of the numbers setting out the amount of money which is adapted to be covered.

More precisely, I propose the provision of a bank check having numbers printed thereon in an orderly fashion to be utilized in a particular manner to indicate the amount in dollars, for which the check has been drawn, whereby to prevent unauthorized altering or raising of the figures.

The auxiliary numbers utilized as a means for comparison with the amount of the check embody nine digits and zero arranged consecutively so that the digits employed in the formation of the amount of the check may be left intact, while those not appearing in said amount may be deleted by punching out, or otherwise destroying.

Other features and advantages of the improved new article of manufacture will become apparent from the following description and drawing.

In the accompanying drawing forming a part of this application, and in which like numerals are employed to designate like parts throughout the same:

Figure 1 is a top plan view of a blank check constructed in accordance with the present invention.

Figure 2 is a view of the same check as it appears when filled in, and punched.

Referring to the drawing in detail, it will be seen that the body of the check is represented by the reference character 1. As is usual, this is provided at its top with a space 2 for reception of the date, a space 3 for reception of the number, lines 4 for reception of the numbers showing the amount of the check in figures and words, a line 5 for the name of the payee, and a line 6 for the signature of the maker. So far, we have substantially a conventional check.

As before stated, the novelty resides in the provision of a plurality of digits 7. There are ten of such digits running consecutively from one through nine, and including a zero. The digits are arranged in a horizontal line in the order shown extending from left to right. Surrounding each digit is a concentric circle 8. On each circle, at circumferentially spaced points are numbers 9. I employ six numbers on each circle running from one through six. The use of the check may be understood from the following example:

Take for instance the showing of the prepared check in Figure 2, here it will be seen that the check is drawn to the order of "J. J. Doe" for an amount of "$7864.00" even. Now, the idea is to employ the digits 7, 8, 6, and 4, for these are found in the amount of the check. Accordingly, the maker takes a suitable instrument and punches out from the centers of the circles 8 all but these four numbers. As shown, he punches out 1, 2, 3, 5, 9, and 0. This leaves 4, 6, 7, and 8. This alone would not be sufficient to enable the proper order of reading of these digits. Accordingly, the numbers 8 around the circles surrounding these four selected digits are utilized as a means for setting out the order in which the digits should be read to correspond with the order that they appear in the amount for which the check has been drawn.

Accordingly, we take a punch and remove all of the indicating numbers 8 around the circle 7 with the exception of the number 1. This shows that the digit 7 is to be read first. Now we take the next circle in which the digit 8 is found, and punch out all but the number 2 on the circle 9. This shows that the digit 8 is read second. The same operation is then repeated on the sixth digit circle, leaving three intact, and showing that 6 is read third. Then a repetition of the same operation in the circle containing the digit 4 will show that 4 is read fourth, or last. Thus, we read "7—8—6—4," and this will compare sufficiently with the numbers appearing on line 4 to prevent alteration of the same. The feature in this arrangement is that the digits which are not found in the amount of the check are entirely removed, and cannot be replaced without detection. Those which do appear in the amount however are left intact so that they may be readily read. In this connection I would state that I am well aware of the fact that it is not new to employ the full number of digits including all of those shown on my improved check. So far as I know, however, previous devices contemplate the mere marking through by a pen and ink line, those digits which appear in the amount of the check. They do not contemplate leaving these digits intact and easily readable, and thoroughly removing all those which are not utilized in the make up of the check amount. Moreover, it appears to be novel to place a circle around the digit with the numbers on the circle indicating the order in which that particular digit is read.

The foregoing concrete examples of the use of the improved check will no doubt suffice to enable persons to obtain a clear understanding of the improvement. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. A bank check having customary appropriately designated spaces on its face for reception of the usual entries, a horizontal row of circles formed across the bottom of the face of the check, a consecutive arrangement of digits in the centers of the circles, and a zero in the center of the remaining circle, circumferentially spaced indicating numbers formed around each circle, said numbers being arranged in numerical order and adapted to be utilized in indicating the order in which the coacting central digit is read in verifying the amount written on the check.

2. A bank check having the customary lines and spaces for reception of the usual entries, a longitudinal row of consecutively arranged digits on the face of the check, a zero formed in alinement with and at one end of said row, and separate and independent members associated with the digits and zero for indicating the order in which the same are to be read.

3. A bank check having the customary appropriately designated spaces and data on its face for reception of the usual entries, a horizontal row of geometrical figures across the bottom of the face of the check, consecutive digits confined in the area bounded by said geometrical figures, and a series of numbers associated with each figure, said numbers being adapted to indicate the order in which the complemental digits are read in verifying the money amount written on the check.

In testimony whereof I affix my signature.

FRANK R. HINTON.